3,187,032
PREPARATION OF NOVEL SILALKYLENE COMPOSITIONS
Donald R. Weyenberg, Midland, Mich., assignor to The Dow Corning Corporation, Midland, Mich., a corporation of Michigan
No Drawing. Filed July 3, 1961, Ser. No. 121,310
15 Claims. (Cl. 260—448.2)

This invention relates to a method of preparing silalkylene copolymers from halogenosilanes and/or halogenosiloxanes with certain substituted ethenes. This invention further relates to some of the novel copolymers which have been prepared by this method.

This application is a continuation-in-part of my copending application Serial Number 55,166, now abandoned, filed September 12, 1960, as a continuation-in-part of my then copending application Serial Number 29,185, filed May 16, 1960, and now abandoned.

More specifically, this invention relates to the method which comprises reacting in a solvent solution in contact with an alkali metal an organosilicon compound (1) selected from the group consisting of halogenosilanes of the formula $R_mSiX_{4-m}$ and halogenosiloxanes of the formula $R_mX_{3-m}Si[OSiR_2]_nX$ in which each R is a monovalent hydrocarbon radical free of aliphatic unsaturation or a functional substituent which can be either the hydrogen atom or an —OR' radical in which R' is a monovalent hydrocarbon radical free of aliphatic unsaturation, each X is a halogen atom, such a chlorine, bromine, iodine or fluorine, each $m$ is a positive integer from 2 to 3 inclusive and each $n$ is a positive integer, and (2) a compound (a) of the formula $R''_2C=CHR''$ in which from one to two R'' substituents are phenyl radicals and any remaining R'' substituent is a hydrogen atom or a methyl radical, there being no more than a total of two phenyl and methyl radicals, or (2) a compound (b) of the formula $R'''CH=CH_2$ in which R''' is a vinyl radical or an alpha-methylvinyl radical.

The solvent employed in this method can be any true organic solvent, i.e. a liquid unreactive to the system but capable of dissolving the organic organosilicon components. The commonest solvents are the well-known hydrocarbon solvents such as, for example, xylene, benzene, toluene, hexane and cyclopentane.

Another class of solvents which are operative in this method are ethers, both monoethers and polyethers, each free of aliphatic unsaturation. For example, the ethers can be dimethyl ether, ethylmethyl ether, diethyl ether, di-n-propyl ether, 1-methoxypentane, tetrahydrofuran, tetrahydropyran, 2-butoxymethyltetrahydrofuran, the dimethyl ether of ethylene glycol, the diethyl ether of ethylene glycol and bis-beta-ethoxyethyl ether. Preferably, the ether is a cyclic ether or a linear ether in which there is at least one ethereal oxygen atom to which is attached at least one group of no more than two carbon atoms, e.g. the methyl and ethyl groups. Also preferred are the linear polyethers having a carbon to oxygen ratio of less than 5:1, more preferably less than 3:1.

The alkali metals employed herein are well known. Since the reaction involved apparently takes place at the alkali metal surface, the alkali metal is usually added as a free metal or a suspension of free metal in some solvent soluble solid or liquid.

In the organosilicon compound (1) R can be, for example, any alkyl radical such as methyl, ethyl, isopropyl, tert-butyl, 2-ethylhexyl, dodecyl, octadecyl and myricyl radicals; any cycloalkyl radical such as the cyclopentyl and cyclohexyl radicals, any aryl radical such as the phenyl radical; any aralkyl radical such as the benzyl, phenylethyl and xylyl radicals and any alkaryl radical such as the tolyl and dimethylphenyl radicals; the hydrogen atom or an —OR' radical in which R' can be any monovalent hydrocarbon radical free of aliphatic unsaturation such as those shown above for R.

The organosilicon compound (1) can have such configurations as, for example: $R_2SiX_2$, $R_3SiX$,

and $R_3Si(OSiR_2)_nX$ where R, X and $n$ are as defined above. These materials can all be prepared by well known methods.

Compound (2) in the method of this invention can be (a) a phenyl-substituted ethene of the formula $$R''_2C=CHR''$$

in which at least from one to two R'' substituents are phenyl radicals and any remaining R'' substituent is a hydrogen atom or a methyl radical, there being no more than a total of two phenyl and methyl radicals. This definition includes compounds such as, for example: $PhCH=CH_2$, $PhMeC=CH_2$, $PhC=CH_2$, $PhCH=CHpH$ and $PhCH=CHMe$, in which Ph and Me represent the phenyl and methyl radicals respectively. Compound (2) can also be (b) a low molecular weight conjugated olefin of the formula $R'''CH=CH_2$ in which R''' is a vinyl radical or an alpha-methylvinyl radical. This definition includes butadiene and isoprene. These materials are all well known.

The method of this invention can be a one-step process or a multiple step process. The multiple step process is preferred for preparing block copolymers since such a process gives the greatest product control. More explicitly, block copolymers can best be prepared by polymerizing compound (2) to the desired polymer size in an ether solvent in contact with an alkali metal, adding a separately prepared chlorosilane or chlorosiloxane (1) of the desired molecular weight and configuration, adding compound (2) and allowing it to add on to the copolymer and to polymerize to the desired block, adding more separately prepared chlorosilane or chlorosiloxane (1) and so forth until the desired block copolymers are built up. These methods are most easily employed at room temperature and atmospheric pressure, but heating, cooling, pressure and vacuum can be employed to vary the reaction if desired.

The method of this invention is useful for the preparation of copolymeric compounds composed of organosilicon units (1) which can have the formulae —$SiR_m$ or —$SiR_m[OSiR_2]_n$— in which R, $m$ and $n$ are as defined above and units (2) which can be phenyl-substituted ethylene units such as, for example, —$CHPh$—$CH_2$—, —$CMePh$—$CH_2$—, —$CPh_2$—$CH_2$ —$CHPh$—$CHPh$— and $CHPh$—$CHMe$— units or units such as

—$CH_2$—$CH=CH$—$CH_2$ or —$CH_2$—$CMe=CH$—$CH_2$—.

The copolymeric compounds containing phenyl-substituted ethylene units are more fully described in my application Serial Number 121,309, filed July 3, 1961, entitled "Phenyl-Substituted Silalkylene Compounds," filed concurrently herewith. The fluid compounds are useful as hydraulic fluids. The solid compounds are useful as both film-forming and fiber-forming resins depending on the functionality of the starting materials.

The copolymeric compounds containing the

—$CH_2$—$CH=CH$—$CH_2$— and/or —$CH_2$—$CMe=CH$—$CH_2$— units can have organosilicon units (1) with, for example, any of the following configurations: —$SiR_2$—, —$SiR_3$, —$SiR_2(OSiR_2)_n$— and $SiR_3(OSiR_2)_n$— where R and $n$ are as defined above. Since R can be

R', H or —OR', these configurations represent such units as, for example,

—SiR'H—, —SiR'(OR')—, —SiH(OR')—, —SiR'$_2$—,
—SiH$_2$—, —Si(OR')$_2$—, —SiR'$_3$, —SiR'$_2$H,
—SiR'$_2$(OR'), —SiR'H$_2$, —SiR'(OR')$_2$, —Si(OR')$_3$,
—SiR'(OR')[OSiR'$_2$]$_n$—,
—SiR'(OR')[OSiR'(OR')]$_n$—, HSiR'$_2$[OSiR'$_2$]$_n$—,
(R'O)SiR'$_2$[OSiR'$_2$]$_n$—, (R'O)$_2$SiR'[OSiR'$_2$]$_n$—,
(R'O)SiR'$_2$[OSiHR']$_n$— and the like. When any of the organosilicon units (1) contain hydrolyzable groups, these groups can be hydrolyzed to hydroxyl groups which can be condensed and co-condensed to form polymeric structures containing new siloxane linkages.

When the copolymers are not endblocked with a —SiR$_3$ unit, they are endblocked primarily with such units as CH$_3$—CH=CH—CH$_2$—, CH$_3$—CMe=CH—CH$_2$— and CH$_3$—CH=CMe—CH$_2$— units. This type of endblocking is accomplished by using a molar excess of unit (2) and hydrolyzing the copolymer.

The fluids of this invention are useful as damping fluids while the solid compositions of this invention are generally useful as both film-forming and fiber-forming resins depending on the functionality of the starting materials. Of primary importance are the compounds which have functional groups, i.e., H or —OR' radicals, attached to the silicon atoms. These compounds are valuable as intermediates in the preparation of chemically integrated copolymers of organosilicon compounds, primarily siloxanes, and organic compounds such as the various rubber polymers. The siloxanes can be cocondensed with the hydrolyzed compounds of this invention while the organic compounds containing aliphatic unsaturation can be reacted with the unsaturated carbon to carbon linkage.

The following examples are merely illustrative and are not intended to limit this invention which is properly delineated in the claims.

*Example 1*

23 grams (1 gram-atom) of sodium metal and 108 grams (1 mol) of trimethylchlorosilane were mixed with 150 ml. (approximately 133 grams) of tetrahydrofuran. To this stirred mixture 52 grams (0.5 mol) of styrene were added. Three products were obtained from this reaction mixture. One was (CH$_3$)$_3$SiCH(C$_6$H$_5$)—CH$_2$Si(CH$_3$)$_3$ a liquid having the following physical properties: boiling point 93° to 97° C. at 4 to 5 mm. Hg pressure; $n_D^{25}$ 1.4890 to 1.4895. The other two products were solid isomers having the general formula:

(CH$_3$)$_3$SiCH(C$_6$H$_5$)CH$_2$CH$_2$CH(C$_6$H$_5$)Si(CH$_3$)$_3$

One of the isomers had a melting point 106.5 to 108° C., while the other had a melting point of 50.5 to 52° C.

When the following silanes are substituted mol per mol for the trimethylchlorosilane above, the following products result:

| Silane | Product |
|---|---|
| (C$_6$H$_{11}$)(CH$_3$)$_2$SiBr | (C$_6$H$_{11}$)(CH$_3$)$_2$SiCH(C$_6$H$_5$) CH$_2$Si(CH$_3$)$_2$(C$_6$H$_{11}$) |
| (C$_{12}$H$_{25}$)(CH$_3$)$_2$SiCl | (C$_{12}$H$_{25}$)(CH$_3$)$_2$SiCH(C$_6$H$_5$)CH$_2$Si(CH$_3$)$_2$(C$_{12}$H$_{25}$) |
| (C$_6$H$_5$CH$_2$)(CH$_3$)$_2$SiCl | (C$_6$H$_5$CH$_2$)(CH$_3$)$_2$SiCH(C$_6$H$_5$)CH$_2$Si(CH$_3$)$_2$(CH$_2$C$_6$H$_5$) |
| (C$_2$H$_5$)$_3$SiCl | (C$_2$H$_5$)$_3$SiCH(C$_6$H$_5$)CH$_2$Si(C$_2$H$_5$)$_3$ |
| (CH$_3$)$_3$SiOSi(CH$_3$)$_2$Cl | (CH$_3$)$_3$SiOSi(CH$_3$)$_2$CH(C$_6$H$_5$)CH$_2$Si(CH$_3$)$_2$OSi(CH$_3$)$_3$ |

*Example 2*

118 grams (1 mol) of α-methylstyrene were added over a 30 minute period to a mixture of 11.5 grams (0.5 gram-atom) of sodium and 400 ml. (approximately 355 grams) of tetrahydrofuran. About 27 grams (0.25 mol) of trimethylchlorosilane were added dropwise with vigorous stirring. The solution remained a characteristic red color throughout this addition. The reaction mixture was filtered and stripped to 150° C. at 0.3 mm. Hg yielding a polymeric product consisting of a poly-α-methylstyrene of 7 to 8 units endblocked with trimethylsilyl units as verified by silicon analysis. This solid had a melting point of approximately 80° C. was soluble in toluene and was insoluble in methanol.

When the following chlorosilanes are substituted for the trimethylchlorosilane in this preparation, the following products result:

| Chlorosilane | Product |
|---|---|
| (C$_6$H$_5$)(CH$_3$)$_2$SiCl | A polymeric product consisting of a poly-α-methylstyrene of 7 to 8 units endblocked with phenyldimethylsilyl units. |
| (CH$_3$)SiCl(OCH$_3$)$_2$ | A polymeric product consisting of a poly-α-methylstyrene of 7 to 8 units endblocked with methyldimethoxysilyl units. |

*Example 3*

To a stirred mixture of 23 grams (1 gram-atom) of sodium metal and 250 ml. (approximately 222 grams) of tetrahydrofuran were added 59 grams (0.5 mol) of α-methylstyrene. To this mixture was added 108 grams (1.0 mol) of trimethylchlorosilane at a rate sufficient to maintain a colorless solution. After further stirring for two days the mixture was distilled to yield (CH$_3$)$_3$SiC(C$_6$H$_5$)(CH$_3$)CH$_2$Si(CH$_3$)$_3$ a liquid having the following physical properties: boiling point 107° to 109° C. at 4 mm. Hg; $n_D^{25}$ 1.5018.

When C$_6$H$_5$CH=CHCH$_3$ is substituted mol per mol for the α-methylstyrene above, (CH$_3$)$_3$SiCH(C$_6$H$_5$)CH(CH$_3$)Si(CH$_3$)$_3$ is produced.

*Example 4*

To a mixture of 129 grams (1 mol) of dimethyldichlorosilane, 46 grams (2 gram-atoms) of sodium metal and 250 ml. of tetrahydrofuran were added 208 grams (2 mols) of styrene over a 30 minute period with external cooling. The mixture was filtered. The solvent was stripped from the liquid portion of the mixture leaving a residue which had a silicon analysis corresponding to a polymer having the formula:

[—CH(C$_6$H$_5$)—CH$_2$—CH$_2$—CH(C$_6$H$_5$)—Si(CH$_3$)$_2$]$_z$ where z is a positive integer. There was no evidence of SiOSi or SiSi linkages.

When ClSi(CH$_3$)$_2$[OSi(CH$_3$)$_2$]$_3$Cl is substituted mol per mol for the dimethyldichlorosilane above, the resulting residue is primarily a copolymer having the approximate formula:

{—CH(C$_6$H$_5$)CH$_2$CH$_2$—CH(C$_6$H$_5$)
[Si(CH$_3$)$_2$O]$_3$Si(CH$_3$)$_2$}$_z$

*Example 5*

26 grams (0.25 mol) of styrene were added over a 30 minute period to a stirred mixture of 15 grams (0.65 gram-atom) of sodium, 54.3 grams (0.5 mol) of trimethylchlorosilane, 200 ml. of diethylether and approximately 20 grams of rock salt. After 24 hours the resulting precipitate was filtered off. Distillation of the filtrate yielded (CH$_3$)$_3$SiCH(C$_6$H$_5$)CH$_2$Si(CH$_3$)$_3$ and the mixture of solid isomers obtained in Example 1.

*Example 6*

54 grams (0.5 mol) of trimethylchlorosilane and 26 grams (0.25) of styrene were added simultaneously with stirring at 65° to 70° C. to a dispersion of 12.5 grams of sodium (as a 50 percent by weight emulsion in paraffin wax) in 110 ml. of benzene. The products isolated were the same as those in Example 1.

*Example 7*

When 11.8 grams (0.1 mol) of α-methylstyrene and 0.46 gram (0.02 gram-atom) of sodium metal are stirred together in 25 ml. of tetrahydrofuran until a red color appears and 1500 grams (0.01 mol) of $$ClSi(CH_3)_2[OSi(CH_3)_2]_{2026}Cl$$

(having a viscosity at 25° C. of approximately one million cs.) dispersed in 3000 ml. of tetrahydrofuran are added with vigorous stirring at a constant rate sufficiently slow to maintain the red color as long as possible, the residue remaining after filtering the mixture and stripping the solvent from the liquid portion is primarily a copolymer having the approximate formula:

$$\{[-C(C_6H_5)(CH_3)CH_2-]_{10}[-Si(CH_3)_2O]_{2026}Si(CH_3)_2-\}_z$$

where z is a positive integer.

*Example 8*

46 grams (2 gram-atoms) of sodium metal were mixed with 300 ml. (approximately 266 grams) of tetrahydrofuran. To this stirred mixture was added a mixture of 208 grams (2 mols) of styrene and 129 grams (1 mol) of dimethyldichlorosilane over a period of one hour. The reaction was exothermic, and external cooling was required. The reaction mixture was filtered. The filtrate was washed with water and dried over anhydrous calcium chloride. Solvent was stripped from the filtrate leaving a residue which was distilled to yield:

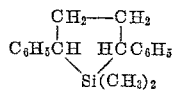

having the following properties: boiling point 143° to 145° C. at 1 mm. Hg; $n_D^{25}$ 1.5746.

*Example 9*

25 grams (0.14 mol) of 1,1-diphenylethene dissolved in 35.5 grams of tetrahydrofuran were added with stirring to a mixture of 6.44 grams (0.28 gram-atom) of finely divided sodium in 88.8 grams of tetrahydrofuran at a rate sufficient to maintain a system temperature of 30° C. 30.4 grams (0.28 mol) of trimethylchlorosilane dissolved in 44.4 grams of tetrahydrofuran were added slowly with stirring to the reaction mixture which was then stirred for 2 days. 2.97 grams (0.13 gram-atom) of sodium metal was recovered by filtration, and the filtrate was distilled producing a liquid product boiling at 220° to 230° C. at 0.2 to 0.3 mm. Hg. This product was recrystallized three times from ethanol producing a white crystalline solid having a melting point of 170° to 172° C. Elemental analysis and the infrared spectrum confirmed the product as $$(CH_3)_3Si-C(C_6H_5)_2-CH_2CH_2-C(C_6H_5)_2-Si(CH_3)_3$$

*Example 10*

25 grams (0.14 mol) of trans-stilbene dissolved in 177.6 grams of tetrahydrofuran were added with stirring to a mixture of 6.44 grams (0.28 gram-atom) of finely divided sodium in 88.8 grams of tetrahydrofuran at a rate sufficient to maintain a system temperature of 30° to 31° C. 30.4 grams (0.28 mol) of trimethylchlorosilane dissolved in 26.6 grams of tetrahydrofuran were added slowly with stirring and external cooling to the reaction mixture which was then stirred for several days. An additional 21.8 grams (0.20 mol) of trimethylchlorosilane were added to the reaction mixture which was then diluted with 264 grams of n-hexane, and filtered to recover 0.7 gram of sodium. The filtrate was distilled producing two products. One product had the following characteristics: boiling point 143° to 147° C. at 4.6 to 4.8 mm. Hg. with $n_D^{25.5}$ of 1.5469. Elemental analysis, infrared spectrum and gas-liquid phase chromatography, confirmed the product as $$(CH_3)_3Si-CH(C_6H_5)-CH_2(C_6H_5)$$

The other product was $$(CH_3)_3SiCH(C_6H_5)-CH(C_6H_5)-Si-(CH_3)_3$$

*Example 11*

196 grams of styrene were added to a mixture of 506 grams of dimethylmethoxychlorosilane, 46 grams of sodium and 750 ml. of tetrahydrofuran with stirring and external cooling. An additional 46 grams of sodium were added, and the mixture was stirred at room temperature for two days. The mixture was then filtered and the filtrate distilled to produce:

(I) $CH_3OSi(CH_3)_2CH(C_6H_5)CH_2Si(CH_3)_2OCH_3$; B.P. 125° to 126° C. at 6–7 mm. Hg; $n_D^{25.5}$ 1.4958

(II) $CH_3OSi(CH_3)_2CH(C_6H_5)CH_2CH_2CH(C_6H_5)Si(CH_3)_2OCH_3$; B.P. 144° to 148° C. at 0.3 mm. Hg.

When the following silanes are substituted mol per mol for the dimethylmethoxychlorosilane above, the following products result:

| Silane | Product |
|---|---|
| $(CH_3)_2SiCl(OC_4H_9)$ | $C_4H_9OSi(CH_3)_2CH(C_6H_5)CH_2Si(CH_3)_2OC_4H_9$ |
| $(CH_3)_2SiCl(OC_6H_5)$ | $C_6H_5OSi(CH_3)_2CH(C_6H_5)CH_2Si(CH_3)_2OC_6H_5$ |
| $(CH_3)_2SiCl(OC_6H_{11})$ | $C_6H_{11}OSi(CH_3)_2CH(C_6H_5)CH_2Si(CH_3)_2OC_6H_{11}$ |
| $(CH_3)_3SiOSi(OCH_3)(CH_3)OSi(CH_3)_2Cl$ | $(CH_3)_3SiOSi(OCH_3)(CH_3)OSi(CH_3)_2CH(C_6H_5)CH_2Si(CH_3)_2OSi(OCH_3)(CH_3)OSi(CH_3)_3$ |

*Example 12*

199 grams dimethylchlorosilane and 104 grams of styrene were added to a mixture of 46 grams of sodium and 50 grams of rock salt in 300 ml. of tetrahydrofuran with stirring and external cooling. The mixture was stirred at least 16 hours at room temperature and was filtered. The filtrate was distilled producing:

(I) $HSi(CH_3)_2CH(C_6H_5)CH_2SiH(CH_3)_2$: B.P. 88° to 90° C. at 4–5 mm. Hg; $n_D^{26}$ 1.5000

(II) A mixture of steroisomers of $HSi(CH_3)_2CH(C_6H_5)CH_2CH_2CH(C_6H_5)SiH(CH_3)_2$; B.P. 164° to 166° C. at 4–5 mm. Hg; $n_D^{26}$ 1.5348–1.5402.

*Example 13*

60 grams (1.1 mols) of butadiene were added with stirring over a period of 2½ hours to a solution of 216 grams (2 mols) of trimethylchlorosilane in 266.4 grams of tetrahydrofuran containing 46 grams (2 gram-atoms) of sodium. The reaction mixture was stirred over a period of 4 to 5 days maintaining the temperature below 45° C. by external cooling. The reaction mixture was filtered permitting recovery of 22 grams of sodium. The filtrate was redistilled three times to give two pure products:

(I) $(CH_3)_3SiCH_2CH=CHCH_2Si(CH_3)_3$; boiling point 105° C. at 50 mm. Hg; $n_D^{25}$ 1.4407.

(II) [(CH$_3$)$_3$SiCH$_2$CH=CHCH$_2$—]$_2$; boiling point 163° C. at 45 mm. Hg; $n_D^{25.8}$ 1.4585.

These structures were verified by elemental analysis, infrared spectra and gas liquid phase chromatography.

Example 14

A solution of 68.1 grams (1 mol) of isoprene in 44.4 grams of tetrahydrofuran was added with stirring over a period of 30 minutes to a solution of 216 grams (2 mols) of trimethylchlorosilane in 266.4 grams of tetrahydrofuran containing 46 grams (2 gram-atoms) of lump sodium. Vigorous stirring and the addition of 50 grams of rock salt accelerated the reaction. The temperature was maintained between 25° and 30° C. by external cooling. After over 20 hours of stirring, the reaction mixture was filtered. The filtrate was distilled and redistilled to give two products.

(I) (CH$_3$)$_3$SiCH$_2$CH=C(CH$_3$)CH$_2$Si(CH$_3$)$_3$; B.P. 104° to 106° C. at 40 mm. Hg; $n_D^{25.2}$ 1.4458

(II) [(CH$_3$)$_3$SiCH$_2$C(CH$_3$)=CHCH$_2$—]$_2$; B.P. 163° to 165° C. at 40 mm. Hg; $n_D^{25.2}$ 1.4656.

Elemental analysis, infrared spectra and gas liquid phase chromatography verified these structures.

Example 15

A mixture of 68.1 grams (1 mol) of isoprene and 129 grams (1 mol) of dimethyldichlorosilane was added slowly with stirring to a mixture of 46 grams of lump sodium in 300 ml. of tetrahydrofuran. The temperature was maintained between 25° and 35° C. with external cooling. The mixture was then stirred at room temperature for at least 16 hours. Unreacted sodium was filtered out, and the filtrate was distilled producing

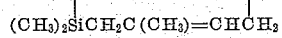

(CH$_3$)$_2$SiCH$_2$C(CH$_3$)=CHCH$_3$ boiling point 123° C.; $n_D^{25.4}$ 1.4453; 1.4462. The product was verified by elemental analysis and the nuclear magnetic resonance spectrum.

Example 16

68 grams of isoprene were added with stirring to a mixture of 248 grams of dimethylmethoxychlorosilane, 46 grams of lump sodium, 50 grams of rock salt and 300 ml. of tetrahydrofuran. This mixture was stirred at room temperature for at least 64 hours. Unreacted sodium was filtered out, and the filtrate was distilled producing:

(I) (CH$_3$)$_2$SiCH$_2$C(CH$_3$)=CHCH$_2$ and (II) (CH$_3$)$_2$(CH$_3$O)SiCH$_2$C(CH$_3$)=CHCH$_2$Si$_2$(OCH$_3$)(CH$_3$)$_2$; B.P. 120° C. at 28 mm. Hg; $n_D^{25.2}$ 1.4441.

Compound II can be hydrolyzed and the resulting hydroxylated compound condensed and cocondensed with other silanols and siloxanols to produce polymeric and copolymeric structures containing siloxane linkages.

When butadiene is substituted mol per mol for the isoprene in the above preparation, the products are

(I) (CH$_3$)$_2$SiCH$_2$CH=CHCH$_2$ and (II) (CH$_3$)$_2$(CH$_3$O)SiCH$_2$CH=CHCH$_2$Si(OCH$_3$)(CH$_3$)$_2$.

| Silane | Products |
|---|---|
| (C$_6$H$_{11}$)(CH$_3$)$_2$SiBr | (C$_6$H$_{11}$)(CH$_3$)$_2$SiCH$_2$CH=C(CH$_3$)CH$_2$Si(CH$_3$)$_2$(C$_6$H$_{11}$)<br>+[(C$_6$H$_{11}$)(CH$_3$)$_2$SiCH$_2$C(CH$_3$)=CHCH$_2$—]$_2$ |
| (C$_6$H$_5$CH$_2$)(CH$_3$)$_2$SiCl | (C$_6$H$_5$CH$_2$)(CH$_3$)$_2$SiCH$_2$C(CH$_3$)=CHCH$_2$Si(CH$_3$)$_2$(CH$_2$C$_6$H$_5$)<br>+[(C$_6$H$_5$CH$_2$)(CH$_3$)$_2$SiCH$_2$C(CH$_3$)=CHCH$_2$—]$_2$ |
| (C$_{12}$H$_{25}$)(CH$_3$)$_2$SiCl | (C$_{12}$H$_{25}$)(CH$_3$)$_2$SiCH$_2$C(CH$_3$)=CHCH$_2$Si(CH$_3$)$_2$(C$_{12}$H$_{25}$)<br>+[(C$_{12}$H$_{25}$)(CH$_3$)$_2$SiCH$_2$C(CH$_3$)=CHCH$_2$—]$_2$ |
| (C$_2$H$_5$)$_3$SiCl | (C$_2$H$_5$)$_3$SiCH$_2$C(CH$_3$)=CHCH$_2$Si(C$_2$H$_5$)$_3$<br>+[(C$_2$H$_5$)$_3$SiCH$_2$C(CH$_3$)=CHCH$_2$—]$_2$ |
| (CH$_3$)$_3$SiOSi(CH$_3$)$_2$Cl | (CH$_3$)$_3$SiOSi(CH$_3$)$_2$CH$_2$C(CH$_3$)=CHCH$_2$Si(CH$_3$)$_2$OSi(CH$_3$)$_3$<br>+[(CH$_3$)$_3$SiOSi(CH$_3$)$_2$CH$_2$C(CH$_3$)=CHCH$_2$—]$_2$ |
| (C$_6$H$_5$)(CH$_3$)$_2$SiCl | (C$_6$H$_5$)(CH$_3$)$_2$SiCH$_2$C(CH$_3$)=CHCH$_2$Si(CH$_3$)$_2$(C$_6$H$_5$)<br>+[(C$_6$H$_5$)(CH$_3$)$_2$SiCH$_2$C(CH$_3$)=CHCH$_2$—]$_2$ |

Example 17

When the following silanes are substituted mol per mol for the trimethylchlorosilane in the preparation of Example 14, the following products result:

Example 18

When 68 grams of isoprene are added over a 30 minute period with external cooling to a mixture of 129 grams of dimethyldichlorosilane, 14 grams of lithium metal and 250 ml. of tetrahydrofuran, the mixture is filtered and the solvent is stripped from the filtered liquid, the residue is a polymer of the general formula

[—CH$_2$C(CH$_3$)=CHCH$_2$—]$_x$[—Si(CH$_3$)$_2$—]$_y$ where $x$ is approximately equal to $y$ and there are no Si-Si linkages.

When ClSi(CH$_3$)$_2$[OSi(CH$_3$)$_2$]$_3$Cl is substituted mol per mol for the dimethyldichlorosilane in the above preparation, the resulting residue is a copolymer of the general formula

[—CH$_2$C(CH$_3$)=CHCH$_2$—]$_x$
{—Si(CH$_3$)$_2$[OSi(CH$_3$)$_2$]$_3$—} where $x$ is equal approximately to $y$ and there are no Si—Si linkages.

Example 19

When the following silanes are substituted mol per mol for the dimethylmethoxychlorosilane in the preparation of Example 16, the following products result:

| Silane | Product |
|---|---|
| (CH$_3$)$_2$SiCl(OC$_4$H$_9$) | C$_4$H$_9$OSi(CH$_3$)$_2$CH$_2$C(CH$_3$)=CHCH$_2$Si(CH$_3$)$_2$OC$_4$H$_9$ |
| (CH$_3$)$_2$SiCl(OC$_6$H$_5$) | C$_6$H$_5$OSi(CH$_3$)$_2$CH$_2$C(CH$_3$)=CHCH$_2$Si(CH$_3$)$_2$OC$_6$H$_5$ |
| (CH$_3$)$_2$SiCl(OC$_6$H$_{11}$) | C$_6$H$_{11}$OSi(CH$_3$)$_2$CH$_2$C(CH$_3$)=CHCH$_2$Si(CH$_3$)$_2$OC$_6$H$_{11}$ |
| (CH$_3$)$_3$SiOSi(OCH$_3$)(CH$_3$)OSi(CH$_3$)$_2$Cl | (CH$_3$)$_3$SiOSi(OCH$_3$)(CH$_3$)OSi(CH$_3$)$_2$CH$_2$C(CH$_3$)<br>CHCH$_2$Si(CH$_3$)$_2$OSi(OCH$_3$)(CH$_3$)OSi(CH$_3$)$_3$ |

Example 20

When dimethylchlorosilane is substituted mol per mol for the dimethylmethoxychlorosilane in the preparation of Example 16, HSi(CH$_3$)$_2$CH$_2$C(CH$_3$)=CHCH$_2$SiH(CH$_3$)$_2$ is produced.

That which is claimed is:

1. The method which comprises reacting in a solvent solution in contact with an alkali metal an organosilicon compound (1) selected from the group consisting of halogenosilanes of the formula R$_m$SiX$_{4-m}$ and halogenosiloxanes of the formula R$_m$X$_{3-m}$Si[OSiR$_2$]$_n$X in which each R is selected from the group consisting of monovalent hydrocarbon radicals free of aliphatic unsaturation and functional substituents selected from the group consisting of the hydrogen atom and —OR' radicals in which R' is a monovalent hydrocarbon radical free of aliphatic unsaturation, each X is a halogen atom, each $m$ is a positive integer from 2 to 3 inclusive and each $n$ is a positive integer, and a compound (2) selected from the group consisting of (a) compounds of the formula $R''_2C=CHR''$ in which at least one R'' substituent is the phenyl radical and any remaining R'' substituent is selected from the group consisting of the hydrogen atom and the methyl radical, there being no more than a total of two phenyl and methyl radicals, and (b) compounds of the formula $R'''CH=CH_2$ in which each R''' is a substituent selected from the group consisting of the vinyl radical and the alpha-methylvinyl radical, whereby the silicon atoms of (1) are attached to aliphatic carbon atoms of (2) with the elimination of X atoms from (1).

2. A copolymeric compound free of Si-Si bonding consisting essentially of organosilicon units (1) selected from the group consisting of units of the formulae —SiR$_m$ and SiR$_m$[OSiR$_2$]$_n$— in which at least one R per unit is a functional substituent selected from the group consisting of the hydrogen atom and —OR' radicals in which R' is a monovalent hydrocarbon radical free of aliphatic unsaturation, any remaining R radicals being monovalent hydrocarbon radicals free of aliphatic unsaturation, each $m$ is a positive integer from 2 to 3 inclusive and each $n$ is a positive integer, and units (2) of the formula selected from the group consisting of —CH$_2$—CH=CH—CH$_2$— and —CH$_2$—C(CH$_3$)=CH—CH$_2$—.

3. A copolymeric compound free of Si-Si bonding consisting essentially of organosilicon units (1) of the formula —SiR'$_m$ in which each R' is a monovalent hydrocarbon radical free of aliphatic unsaturation and $m$ is a positive integer from 2 to 3 inclusive and units (2) of the formula —CH$_2$—C(CH$_3$)=CHCH$_2$—.

4. A copolymeric compound free of Si-Si bonding consisting of organosilicon units (1) of the formula —SiR'$_3$ in which each R' is a monovalent hydrocarbon radical free of aliphatic unsaturation and units (2) of the formula —CH$_2$—C(CH$_3$)=CHCH$_2$—.

5. A copolymeric compound free of Si-Si bonding consisting of —Si(CH$_3$)$_3$ units and

—CH$_2$—C(CH$_3$)=CHCH$_2$— units.

6. A copolymeric compound free of Si-Si bonding consisting essentially of organosilicon units (1) of the formula —SiR'$_2$— in which each R' is a monovalent hydrocarbon radical free of aliphatic unsaturation and units (2) of the formula —CH$_2$—C(CH$_3$)=CHCH$_2$—.

7. A copolymeric compound free of Si-Si bonding consisting of —Si(CH$_3$)$_2$— units and

—CH$_2$—C(CH$_3$)=CHCH$_2$— units.

8. A copolymeric compound free of Si-Si bonding consisting essentially of organosilicon units (1) of the formula —SiR'$_m$ in which each R' is a monovalent hydrocarbon radical free of aliphatic unsaturation and $m$ is a positive integer from 2 to 3 inclusive and units (2) of the formula —CH$_2$—CH=CH—CH$_2$—, the ratio of units (2) to units (1) being at least $m-1$.

9. A copolymeric compound free of Si-Si bonding consisting of organosilicon units (1) of the formula —SiR'$_3$ in which each R' is a monovalent hydrocarbon radical free of aliphatic unsaturation and units (2) of the formula —CH$_2$—CH=CHCH$_2$—, the ratio of (2) to (1) being at least 2.

10. The compound of claim 9 in which each R' is the methyl radical.

11. A copolymeric compound free of Si-Si bonding consisting essentially of organosilicon units (1) of the formula —SiR$_m$ in which $m$ is a positive integer from 2 to 3 inclusive, from one to two R substituents are —OR' radicals in which R' is a monovalent hydrocarbon radical free of aliphatic unsaturation, any remaining R radicals being monovalent hydrocarbon radicals free to aliphatic unsaturation, and units (2) of the formula

—CH$_2$—CH=CH—CH$_2$—

12. A copolymeric compound free of Si-Si bonding consisting essentially of organosilicon units (1) of the formula —SiR'$_2$(OR') in which each R' is a monovalent hydrocarbon radical free of aliphatic unsaturation and units (2) of the formula —CH$_2$—CH=CH—CH$_2$—.

13. The compound of claim 12 in which each R' is the methyl radical.

14. A copolymeric compound free of Si-Si bonding consisting essentially of organosilicon units (1) of the formula —SiR$_m$ in which $m$ is a positive integer from 2 to 3 inclusive, from one to two R substituents are —OR' radicals in which R' is a monovalent hydrocarbon radical free of aliphatic unsaturation, any remaining R radicals being monovalent hydrocarbon radicals free of aliphatic unsaturation, and units (2) of the formula

—CH$_2$C(CH$_3$)=CH—CH$_2$—

15. A copolymeric compound free of Si-Si bonding consisting essentially of organosilicon units (1) of the formula —SiR'$_2$(OR') in which each R' is a monovalent hydrocarbon radical free of aliphatic unsaturation and units (2) of the formula

—CH$_2$C(CH$_3$)=CH—CH$_2$—

References Cited by the Examiner

UNITED STATES PATENTS

| | | | |
|---|---|---|---|
| 2,954,390 | 9/60 | Pike et al. | 260—448.2 |
| 2,959,569 | 11/60 | Warrick | 260—448.2 |
| 2,970,150 | 1/61 | Bailey | 260—46.5 |

FOREIGN PATENTS

| | | |
|---|---|---|
| 147,410 | 6/48 | Australia. |
| 918,527 | 7/49 | Germany. |
| 589,648 | 4/53 | Great Britain. |
| 689,648 | 4/53 | Great Britain. |

OTHER REFERENCES

Ryan et al.: "Journal of Organic Chemistry," 24, 1959, 2052–53.

MURRAY TILLMAN, *Primary Examiner.*

MILTON STERMAN, J. R. LIBERMAN, WILLIAM H. SHORT, *Examiners.*

UNITED STATES PATENT OFFICE
CERTIFICATE OF CORRECTION

Patent No. 3,187,032                                          June 1, 1965

Donald R. Weyenberg

It is hereby certified that error appears in the above numbered patent requiring correction and that the said Letters Patent should read as corrected below.

Column 2, line 19, for "$PhC=CH_2$, $PhCH=CHpH$" read -- $Ph_2C=CH_2$, $PhCH=CHPh$ --; column 3, in the table, second column, line 1 thereof, for "$(C_6H_{11})(CH_3)_2SiCH(_6H_5)CH_2Si(CH_3)_2(C_6H_{11})$" read -- $(C_6H_{11})(CH_3)_2SiCH(C_6H_5)CH_2Si(CH_3)_2(C_6H_{11})$ --; column 6, line 32, for "$n_D^{25.5}$" read -- $n_D^{25.2}$ --; column 7, line 74, for "$n^{Di}_{25.2}$" read -- $n_D^{25.2}$ --; columns 7 and 8, in the table at the top of the page, second column, line 5 thereof, for "$C_{12}H_{25})(CH_3)_2SiCH_2C(CH_3)=CHCH_2Si(CH_3)_2(C_{12}H_{25})$" read -- $(C_{12}H_{25})(CH_3)_2SiCH_2C(CH_3)=CHCH_2Si(CH_3)_2(C_{12}H_{25})$ --; same columns 7 and 8, in the table at the bottom of the page, second column, line 4 thereof, for "$(CH_3)_3SiOSi(OCH_3)(CH_3)OSi(CH_3)_2CH_2C(CH_3)$" read -- $(CH_3)_3SiOSi(OCH_3)(CH_3)OSi(CH_3)_2CH_2C(CH_3)=$ --.

Signed and sealed this 10th day of May 1966.

(SEAL)
Attest:

ERNEST W. SWIDER                                    EDWARD J. BRENNER
Attesting Officer                                Commissioner of Patents